US 9,303,734 B2

(12) United States Patent
Serkh et al.

(10) Patent No.: US 9,303,734 B2
(45) Date of Patent: Apr. 5, 2016

(54) BELT TRANSMISSION

(71) Applicant: The Gates Corporation, Denver, CO (US)

(72) Inventors: Alexander Serkh, Troy, MI (US); Dean Schneider, Washington, MI (US)

(73) Assignee: Gates Corporation, Denver, CO (US)

( * ) Notice: Subject to any disclaimer, the term of this patent is extended or adjusted under 35 U.S.C. 154(b) by 349 days.

(21) Appl. No.: 13/963,726

(22) Filed: Aug. 9, 2013

(65) Prior Publication Data

US 2015/0045162 A1 Feb. 12, 2015

(51) Int. Cl.
F16H 7/02 (2006.01)
F16H 7/08 (2006.01)
B62D 5/04 (2006.01)

(52) U.S. Cl.
CPC ............... *F16H 7/02* (2013.01); *B62D 5/0412* (2013.01); *F16H 7/08* (2013.01); *F16H 7/0827* (2013.01)

(58) Field of Classification Search
CPC ..................................... F16H 7/02; F16H 7/08
USPC ............................................. 474/88, 148, 152
See application file for complete search history.

(56) References Cited

U.S. PATENT DOCUMENTS

| | | | | |
|---|---|---|---|---|
| 3,364,766 A | * | 1/1968 | Ramo | D01G 15/36 474/27 |
| 3,715,928 A | * | 2/1973 | Case | F16H 3/00 474/1 |
| 3,863,514 A | * | 2/1975 | Jensen | B62M 11/04 474/13 |
| 4,403,979 A | | 9/1983 | Wujick | |
| 4,502,345 A | * | 3/1985 | Butterfield | B60K 25/02 123/198 R |
| 4,662,861 A | * | 5/1987 | Seung | F02B 67/06 192/48.92 |
| 4,768,997 A | * | 9/1988 | Page | A01D 34/6806 474/27 |
| 4,840,608 A | | 6/1989 | Araki et al. | |

(Continued)

FOREIGN PATENT DOCUMENTS

| | | |
|---|---|---|
| EP | 405059 A2 | 1/1991 |
| EP | 2159448 A1 | 3/2010 |

(Continued)

OTHER PUBLICATIONS

European Patent Office, Notification of Transmittal of the International Search Report and the Written Opinion of the International Searching Authority, or the Declaration, Mailing date Oct. 16, 2014.

(Continued)

*Primary Examiner* — William E Dondero
*Assistant Examiner* — Mark K Buse
(74) *Attorney, Agent, or Firm* — Jeffrey A. Thurnau, Esq.; Paul N. Dunlap, Esq.

(57) ABSTRACT

A belt transmission comprising a housing, a first belt trained between a first shaft and a first intermediate shaft, a second belt trained between the first intermediate shaft and a second intermediate shaft, a third belt trained between the second intermediate shaft and a second shaft, a first tensioner and second tensioner each engaged with the housing and each engaged about the first intermediate shaft whereby each tensioner exerts a force upon the first intermediate shaft which thereby imparts a tension to the first belt and to the second belt, and a third tensioner and fourth tensioner each engaged with the housing and each engaged about the second intermediate shaft whereby each tensioner exerts a force upon the second intermediate shaft which thereby imparts a tension to the second belt and to the third belt.

30 Claims, 12 Drawing Sheets

(56) References Cited

U.S. PATENT DOCUMENTS

| | | | |
|---|---|---|---|
| 4,922,727 A * | 5/1990 | Viegas | F25B 27/00 |
| | | | 474/84 |
| 5,209,705 A | 5/1993 | Gregg | |
| 6,685,785 B1 | 2/2004 | Morris et al. | |
| 7,070,526 B2 * | 7/2006 | Lawrence | F01L 1/024 |
| | | | 123/192.2 |
| 7,237,647 B2 | 7/2007 | Nakamura et al. | |
| 7,490,696 B2 | 2/2009 | Saruwatari et al. | |
| 7,798,928 B2 * | 9/2010 | Serkh | F02B 67/06 |
| | | | 474/152 |
| 7,887,446 B2 | 2/2011 | Hironaka | |
| 7,905,317 B2 | 3/2011 | Kruttschnitt et al. | |
| 8,216,113 B2 * | 7/2012 | Parsons | F02N 11/04 |
| | | | 180/53.8 |
| 8,327,972 B1 | 12/2012 | Schneider | |
| 8,408,188 B1 * | 4/2013 | Hormilla | F02B 67/06 |
| | | | 123/195 A |
| 8,454,463 B2 * | 6/2013 | Parsons | F02N 11/04 |
| | | | 474/148 |
| 2002/0119854 A1 | 8/2002 | Mohr et al. | |
| 2005/0121251 A1 | 6/2005 | Ueno et al. | |

FOREIGN PATENT DOCUMENTS

| | | |
|---|---|---|
| JP | 2000320626 | 11/2000 |
| JP | 1113840 | 11/2011 |

OTHER PUBLICATIONS

"Noise and Life of Helical Timing Belt Drives", Ueda et al., Transactions of the ASME, vol. 121, Jun. 1999.

* cited by examiner

BELT TRANSMISSION

FIELD OF THE INVENTION

The invention relates to a belt transmission, and more particularly, to a belt transmission comprising a first tensioner and second tensioner engaged about an intermediate shaft, the first tensioner and second tensioner each comprising a first arm and second arm and a torsion spring engaged therebetween, the first arm and second arm each bearing upon a surface, the first arm and second arm rotatable by operation of the torsion spring to exert a force upon the intermediate shaft whereby a tension is imparted to a first belt and a second belt engaged with the intermediate shaft.

BACKGROUND OF THE INVENTION

Electric power assist steering systems (EPAS) have been around since the 1960's. Hydraulic power assist steering has traditionally dominated the market. Hydraulic systems have high parasitic energy loss when the hydraulic pump is pumping, but power assist is not required. Early attempts to eliminate this parasitic loss involved fitting an electric motor to the pump and only driving the pump when necessary.

Electric hydraulic assisted power steering systems use an electric motor to drive a hydraulic pump to feed a hydraulic power steering system. These systems are an intermediate step by the industry and their use will likely fade with the increased use of EPAS. EPAS systems allow realization of reduced noise, reduced energy use, active safety features, and adjustability to meet driving conditions. However, the use of these systems has remained limited until recent C.A.F.E. requirements became more difficult to meet. This is driving automotive manufactures to turn to EPAS systems more and more in an effort to improve vehicle fuel economy. EPAS systems eliminate the parasitic losses typically found in hydraulic assist power steering systems.

For example, one difficulty that slowed implementation of EPAS systems was meeting the power requirement with a 12 volt electric motor. Recently systems have been developed that successfully solve this problem. Further, all EPAS systems require a control module to sense driver input and control the electric motor to provide the desired assist. The control module measures driver input torque and uses this to determine the amount of assist required. Assist can be tuned to meet the drivers need depending on driving conditions. The system can even have a tunable "feel" available to the driver.

Even though the main driver for automotive EPAS is fuel economy improvement, EPAS has additional benefits. The system can make steering assist available even when the vehicle's engine is not running. It also enables the use of the automatic parallel parking systems available today.

There are two main types of EPAS systems; column assist and rack assist. Rack assist EPAS systems have an electric motor that is connected to the steering rack. The electric motor assists the rack movement usually through driving a lead screw mechanism. Column assist EPAS systems have an electric motor connected to the steering column. The electric motor assists the movement of the column shaft usually through a worm gear type arrangement. One advantage of these types of systems is the electric motor can be placed in the passenger compartment freeing up valuable space under the hood. This also keeps any sensitive electrical components out of the harsh under hood environment.

Worm drive column assist systems are usually used in small cars where the assist power requirements are lower than what would be needed in a large heavy vehicle. These systems are limited by the speed of the steering wheel and the ratio of the worm drive. The steering wheel at its fastest speed rotates relatively slowly at approximately 60 rpm. With a 60 rpm speed of the steering wheel and a worm drive ratio of 15:1, the max speed of the electric motor would only be 900 rpm. Worm drives are limited to ratios under 20:1 because ratios higher than that cannot be back-driven.

The steering system must be able to be operated with no power. This requires the worm drive be able to operate with the gear driving the worm (back-driven). Having a low motor speed and limited ratio worm drive causes the need for high torque motor. Even with a high torque motor, these types of systems have not been made successful on heavy vehicles. Small vehicles are light and require less steering effort thus enabling the use of these systems. Worm drive column assist SPAS systems are the lowest cost systems and thus also lend themselves to smaller less expensive vehicles.

Typical steering systems with worm drive assists are limited in their efficiency. EPAS systems must be designed to operate when there is no power available. Due to the nature of worm drive's tendency to lock up during back driving when ratios exceed approximately 20:1, worm drive EPAS systems efficiency is not greater than approximately 85% and nearer to 65% during back-driving conditions.

Representative of the art is U.S. Pat. No. 8,327,972 which discloses a vehicle steering system transmission comprising a housing, an input shaft journalled to the housing, an electric motor connected to the housing and coupled to the input shaft, an output shaft journalled to the housing, the input shaft and the output shaft coupled by a first pair of sprockets having a first belt trained therebetween and having a first ratio, the first belt and first pair of sprockets comprising a helical tooth configuration, the input shaft and the output shaft coupled by a second pair of sprockets having a second belt trained therebetween and having a second ratio, and the input shaft and the output shaft coupled by a third pair of sprockets having a third belt trained therebetween and having a third ratio.

What is needed is a belt transmission comprising a first tensioner and second tensioner engaged about an intermediate shaft, the first tensioner and second tensioner each comprising a first arm and second arm and a torsion spring engaged therebetween, the first arm and second arm each bearing upon a surface, the first arm and second arm rotatable by operation of the torsion spring to exert a force upon the intermediate shaft whereby a tension is imparted to a first belt and a second belt engaged with the intermediate shaft. The present invention meets this need.

SUMMARY OF THE INVENTION

The primary aspect of the invention is to provide a belt transmission comprising a first tensioner and second tensioner engaged about an intermediate shaft, the first tensioner and second tensioner each comprising a first arm and second arm and a torsion spring engaged therebetween, the first arm and second arm each bearing upon a surface, the first arm and second arm rotatable by operation of the torsion spring to exert a force upon the intermediate shaft whereby a tension is imparted to a first belt and a second belt engaged with the intermediate shaft.

Other aspects of the invention will be pointed out or made obvious by the following description of the invention and the accompanying drawings.

The invention comprises a belt transmission comprising a housing, a first belt trained between a first shaft and a first intermediate shaft, a second belt trained between the first intermediate shaft and a second intermediate shaft, a third belt trained between the second intermediate shaft and a second shaft, a first tensioner and second tensioner each engaged with the housing and each engaged about the first intermediate shaft whereby each tensioner exerts a force upon the first intermediate shaft which thereby imparts a tension to the first belt and to the second belt, and a third tensioner and fourth tensioner each engaged with the housing and each engaged about the second intermediate shaft whereby each tensioner exerts a force upon the second intermediate shaft which thereby imparts a tension to the second belt and to the third belt.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
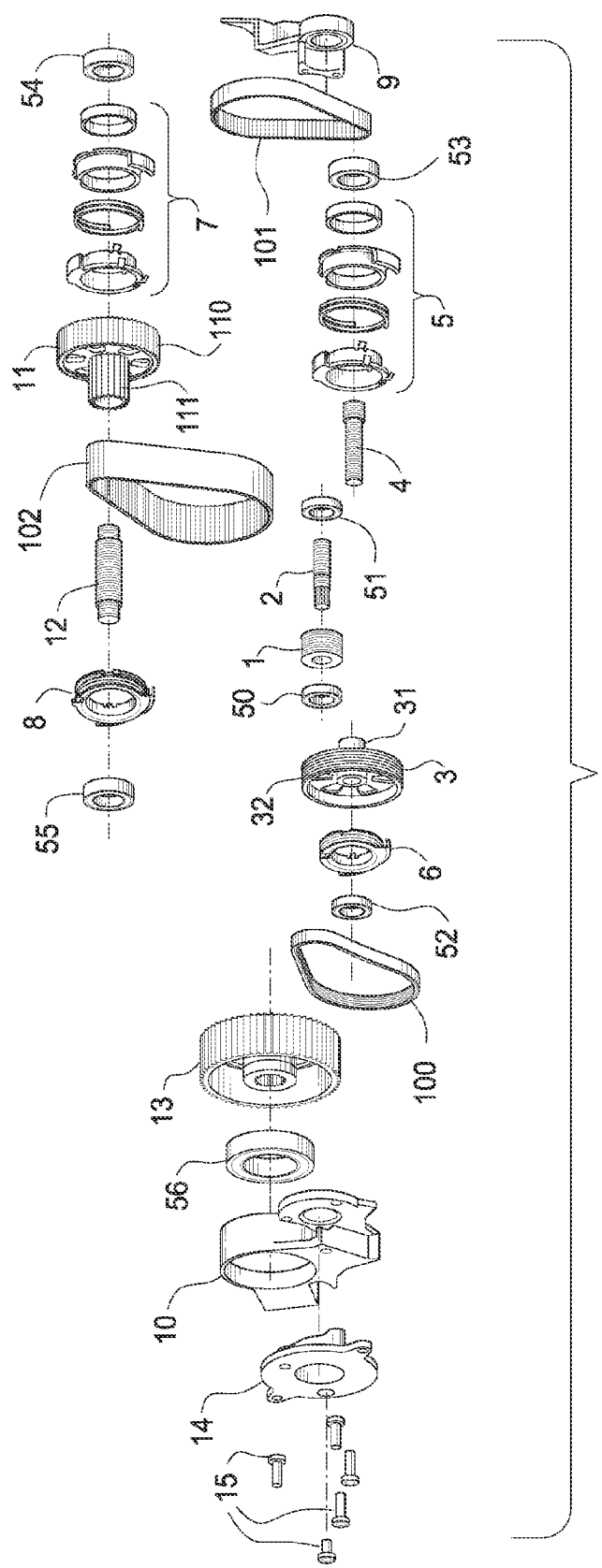
FIG. 1 is an exploded view of the device.

FIG. 1 is an exploded view of the device. The inventive device comprises a three stage belt drive transmission. Drive stage one comprises a multi-ribbed belt 100 with a drive ratio of 2.4:1. Stage two comprises a toothed or synchronous belt 101 with a ratio of 3.8:1. Stage 3 comprises a toothed or synchrounous belt 102 with a ratio of 3.5:1. The overall drive ratio of the transmission is 31.9:1. Of course, a desired drive ratio can be selected by altering the diameter of the pulleys and sprockets as described herein.

The inventive device comprises input shaft 2, input pulley 1, multi-ribbed belt 100, compound pulley/sprocket 3, a first intermediate shaft 4, automatic tensioner assemblies 5, 6, 7, and 8, a compound sprocket 11, a second intermediate shaft 12, a 3 mm pitch toothed or synchronous belt 101, a 5 mm toothed or synchronous belt 102, an synchronous sprocket 13, housing portion 9, housing portion 10, a plurality of bearings (50, 51, 52, 53, 54, 55, 56), a motor mount 14, and a plurality of fasteners 15. A synchronous or toothed belt comprises teeth which extend across a width of the belt.

Input shaft 2 is mounted on bearings 50, 51. Input pulley 1 is press fit to input shaft 2. Bearings 51 and 50 are mounted in each housing 9 and housing 10 respectively, thereby supporting input shaft 2.

Compound pulley/sprocket 3 is mounted on first intermediate shaft 4. First intermediate shaft 4 is mounted on bearings 52, 53. In turn, bearings 53, 52 are each mounted within an automatic tensioner 5 and automatic tensioner 6 respectively. Automatic tensioner 5 and automatic tensioner 6 along with bearings 53, 52 are each in contact with housing 9 and housing 10, respectively. Compound pulley/sprocket 3 comprises pulley 32 for engaging belt 100 and sprocket 31 for engaging belt 101.

Second intermediate shaft 12 is mounted on a pair of bearings 54, 55. Compound sprocket 11 is mounted to intermediate shaft 12. Bearings 54, 55 are each mounted in automatic tensioner 7 and automatic tensioner 8 respectively. Automatic tensioner 7 and 8 with bearings 54, 55 respectively are each in contact with housing 9 and housing 10. Compound sprocket 11 comprises sprocket 110 for engaging belt 101 and sprocket 111 for engaging belt 102.

Output sprocket 13 is mounted on a bearing 56. Bearing 56 is mounted in housing 10. Housing portion 9 and housing portion 10 are bolted together using fasteners 15. Motor mount 14 is bolted to housing 10. A motor or other driver (not shown) can be mounted to motor mount 14. Sprocket 13 engages belt 102.

Multi-ribbed belt 100 transmits power from input pulley 1 to pulley 32. A multi-ribbed belt comprises ribs that extend in the endless of longitudinal direction of the belt. Belt 101 transmits power from sprocket 31 to sprocket 110. Belt 102 transmits power from sprocket 111 to output sprocket 13.

Output sprocket hub 130 is configured to enable connection to a vehicle steering shaft (not shown). Input shaft 2 is configured to allow connection to an electric motor or other power source (not shown). Housing 10 further comprises a bracket 82, see FIG. 18, for mounting the inventive device to a vehicle (not shown).

Known tensioners typically comprise a rigidly mounted base and a moveable arm assembly with an idler pulley journalled to the moveable arm. The idler pulley is forceably engaged with a belt by a torsion spring which tensions a belt. Each automatic tensioner 5, 6, 7, and 8 differs from the prior art wherein the prior art tensioner base is replaced by an arm which acts as a second tensioner arm in the inventive device, see FIG. 5.

Automatic tensioner 5 and 6 act cooperatively to position shaft 4 thereby tensioning belt 100 and belt 101. Automatic tensioner 7 and 8 act cooperatively to position shaft 12 thereby tensioning belt 101 and belt 102.

Automatic tensioner 5 and 7 act upon housing 9. Automatic tensioner 6 and 8 act upon housing 10, which in turn the combination creates a reaction force upon the movable intermediate shaft 4. The reaction force exterted on the moveable intermediate shaft 4 positions the shaft to a position of equilibrium based upon the tension in belt 100 and belt 101. Shaft 4 and pulley 3 move into a position where the belt tension is equal to the combined force pf tensioners 5 and 6. The same operating principle is realized by tensioners 7 and 8 acting on intermediate shaft 12 and thereby pulley 11. In this Figure tensioner 5 and tensioner 7 are shown in exploded view. Tensioner 6 and tensioner 8 are not shown in exploded view. Tensioners 5, 6, 7, 8 are of the same design and description.

Figure 2:
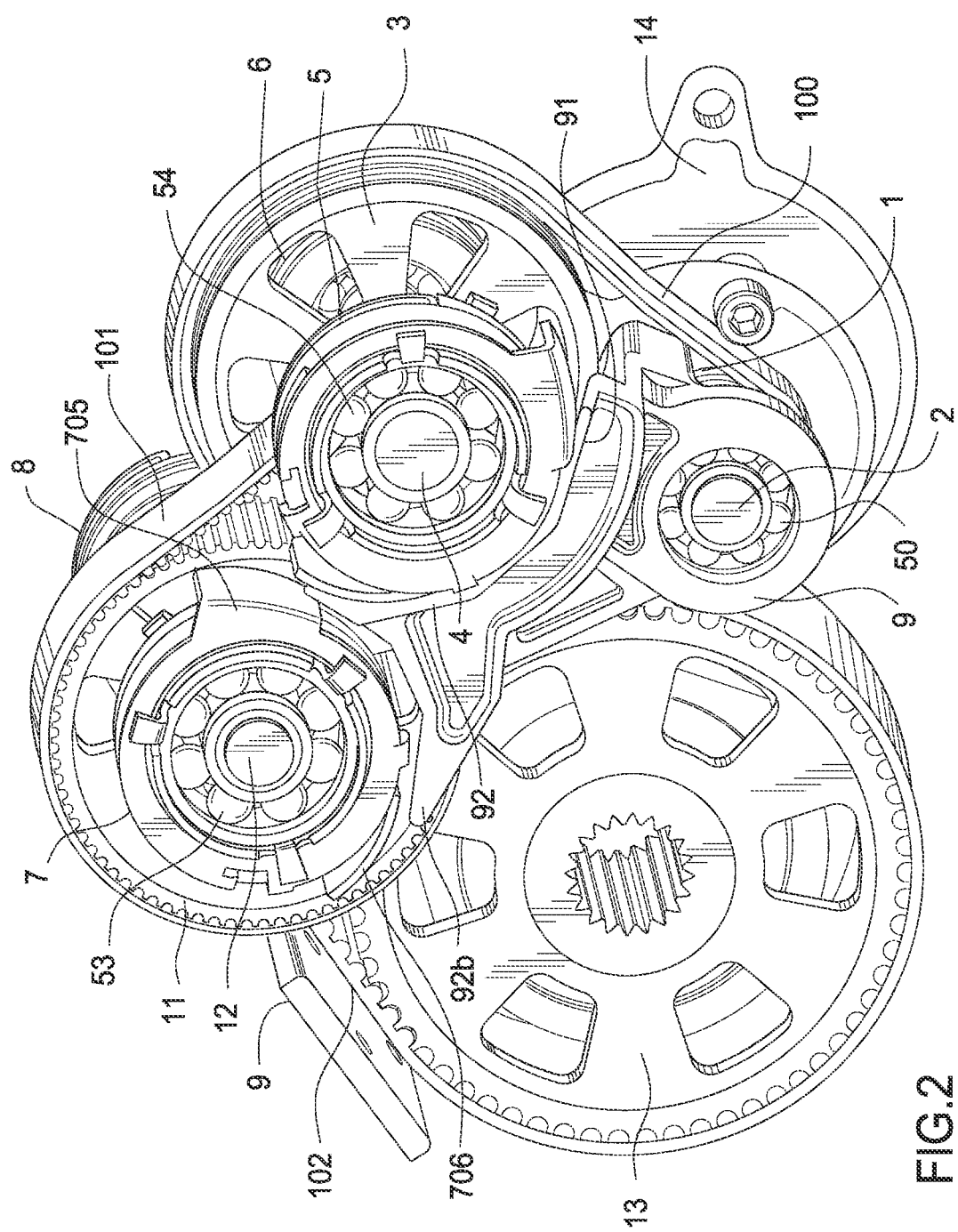
FIG. 2 is a front perspective view of the device.

FIG. 2 is a front perspective view of the device. Housing 9 is omitted from this drawing.

Figure 3:
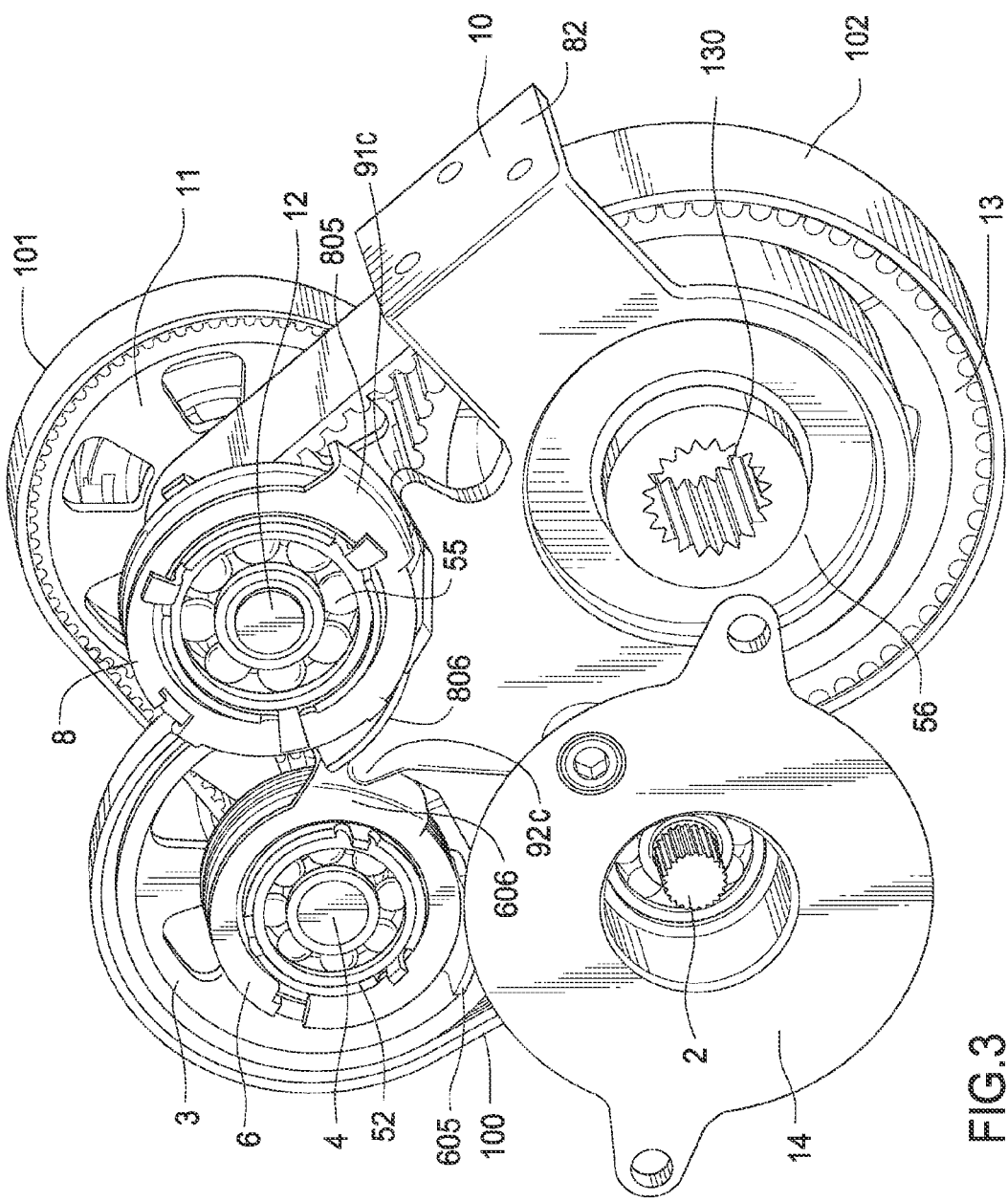
FIG. 3 is a back perspective view of the device.

FIG. 3 is a back perspective view of the device. Shaft 2 engages an electric motor or other suitable driver (not shown).

Member 82 mounts the device to a suitable mounting surface (not shown). Bearing 52 supports tensioner 6. Bearing 55 supports tensioner 8.

Figure 4:
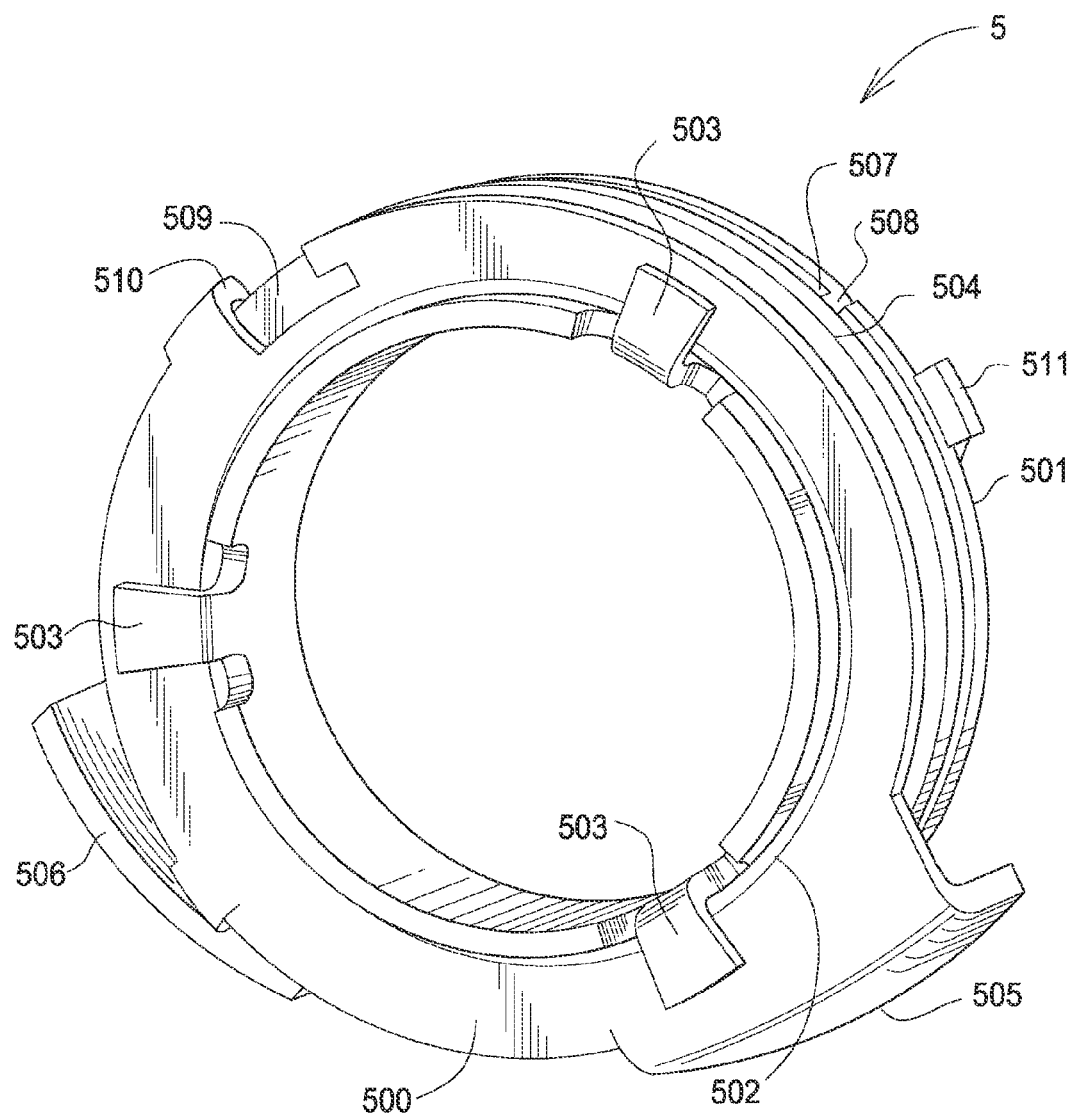
FIG. 4 is a view of the tensioner assembly.

FIG. 4 is a view of the tensioner assembly. The inventive automatic tensioner comprises an arm 500, a bushing 502, a torsion spring 504, and an arm 501. Arm 500 is rotatably connected to arm 501 with bushing 502 providing a low friction surface to facilitate movement. One end 509 of the torsion spring 504 rests against a face 510 on arm 500. The opposite end 507 of the torsion spring 504 rests against a face 508 on arm 501. Spring 504 is loaded in the unwinding direction. Arm 500 comprises tangs 503 which hold the tensioner assembly together. Arm 501 comprises tangs 511 which hold the tensioner assembly together. Arm 501 comprises arcuate tensioner surface 506. Surface 506 contacts a bracket surface 92 on housing 9, see FIG. 15. Arm 500 comprises arcuate tensioner surface 505. Surface 505 contacts a bracket surface 91 on housing 9, see FIG. 15. This description is also applicable to automatic tensioners 6, 7 and 8.

Figure 5:
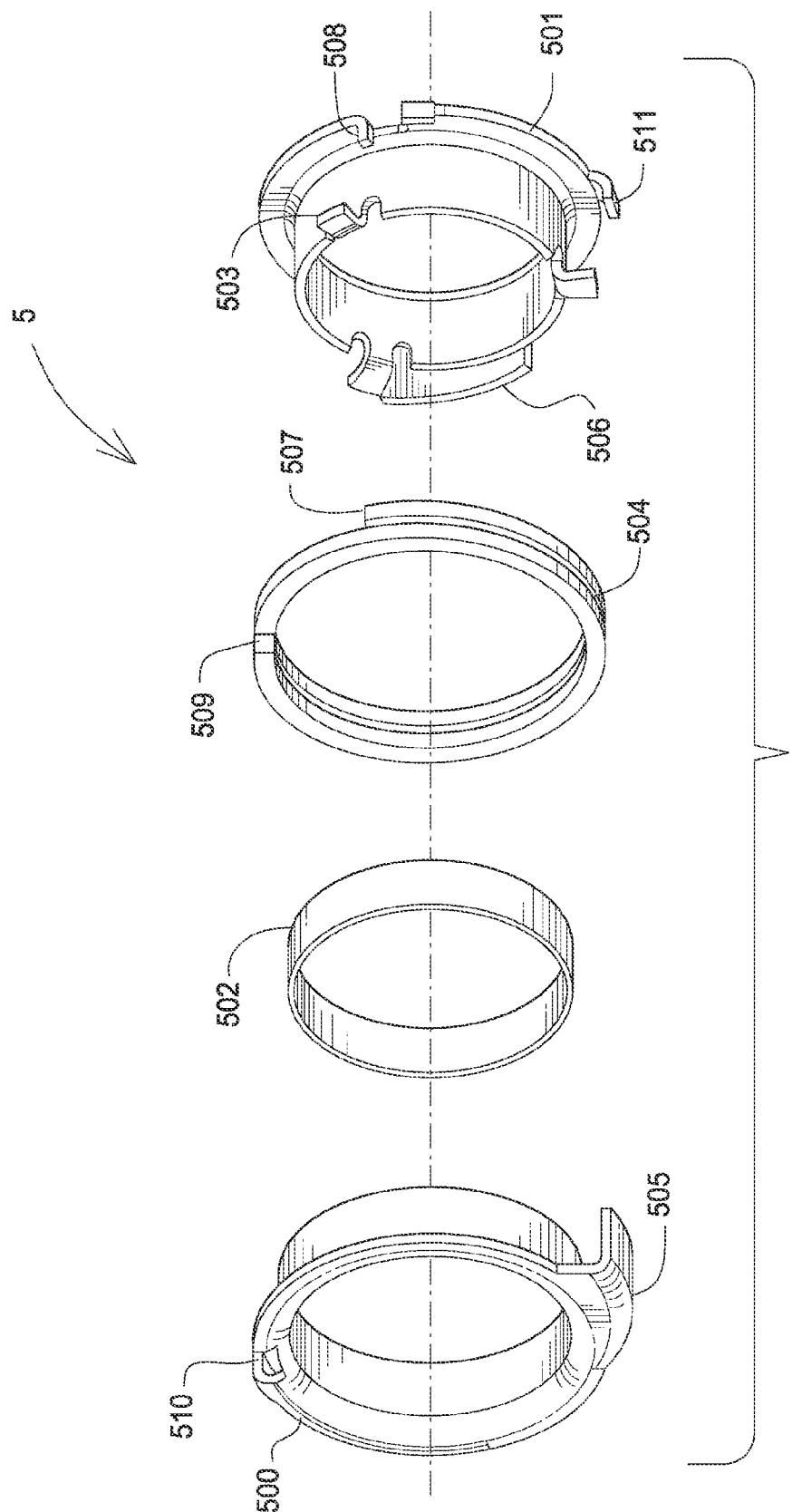
FIG. 5 is an exploded view of a tensioner assembly.

FIG. 5 is an exploded view of a tensioner assembly. Tensioner 5 receives a bearing 52 which in turn engages shaft 4. Tensioner arms 500, 501 are cam like in configuration. The cam like arms rotate around the center of the bearing 52, namely, the rotation center, see FIG. 19. Arms 500, 501 are each configured similarly, that is, a circle within a circle having offset centers and different radii, see FIG. 19.

Figure 15:
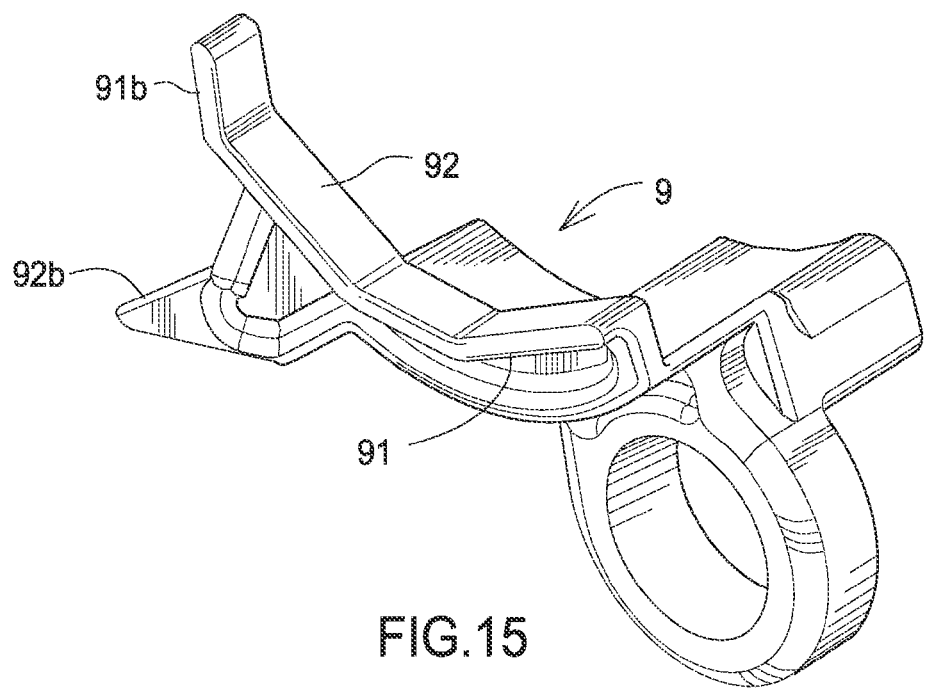
FIG. 15 is a perspective view of housing 9.

Arms 500, 501 comprise surfaces 505, 506 respectively which rest on bracket surface 91 and bracket surface 92, see FIG. 15. Torsion spring 504 provides a moment to each arm in opposing directions. End 507 bears against tab 508. End 509 bears against tab 510. A spring force forcibly rotates the arm surfaces 505, 506 against surfaces 91, 92 of the housing 91, 92. Since the arms are cam like in operation this causes the rotation center of bearing 52 and thus shaft 4 and pulley 3 to move in a direction which properly tensions belts 100 and 101. The movement stops when the belt tension is equal to the force of tensioners 5 and 6. This description is also applicable to operation of automatic tensioners 6, 7 and 8 as well.

Figure 6:
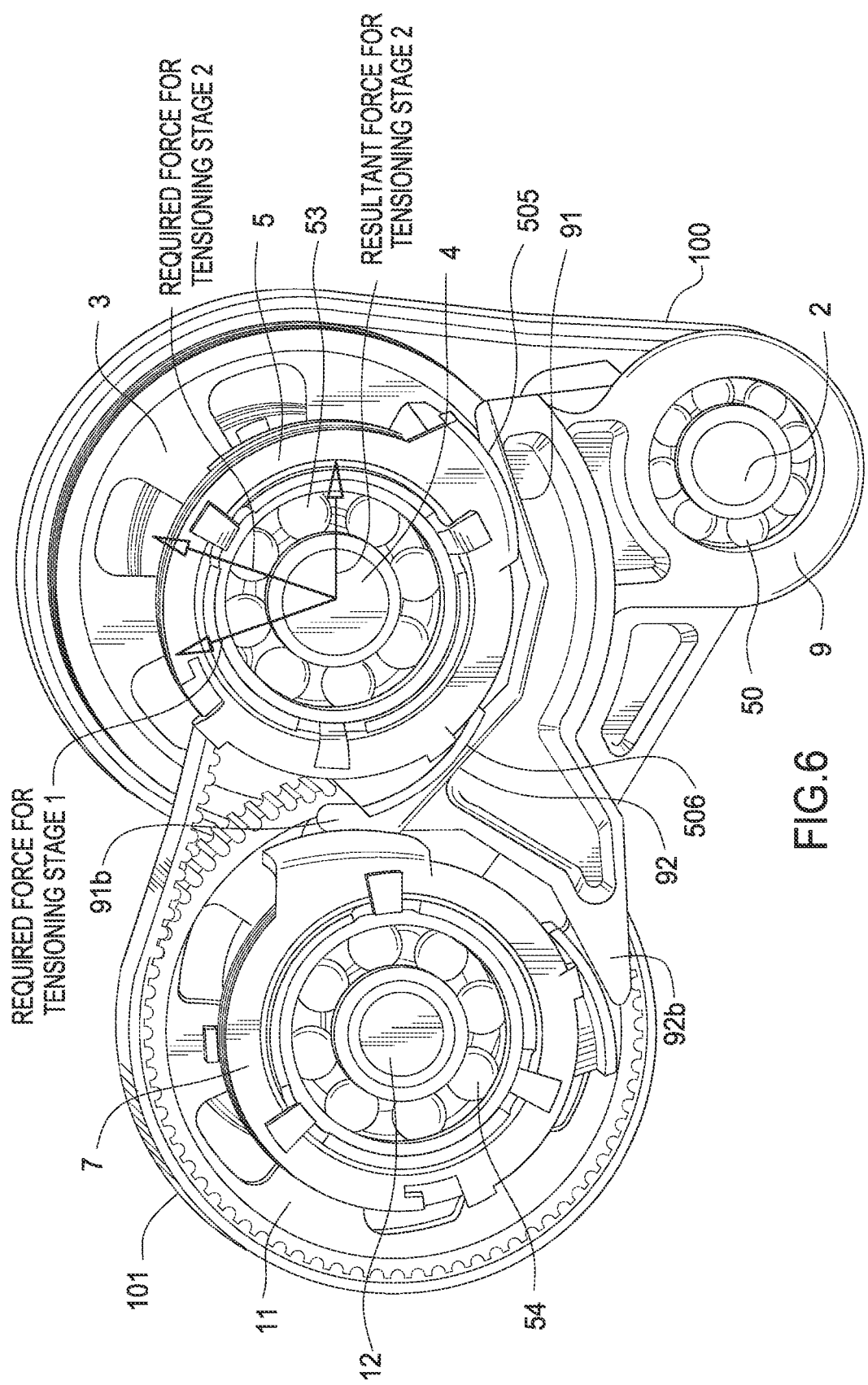
FIG. 6 is a detail of the tensioner assembly in the device.

FIG. 6 is a detail of the tensioner assembly in the device. The tensioners operate in pairs, namely, tensioners 5 and 6 act cooperatively to support shaft 4. Tensioners 7 and 8 act cooperatively to support shaft 12. Each pair of tensioners forcibly position shaft 4 and shaft 12 which provides the force necessary to properly tension the belts.

For the two belts (101, 102) engaged with each compound pulley/sprocket (3, 11) the tensioning force is preferably oriented such that the proper force in the proper direction is applied to create the desired tension in each belt.

Proper belt tension depends on the diameter of the pulley and the desired torque in the system. For example, a torque input to input pulley 1 is 1.88 Nm and the pulley diameter is 30 mm. This yields a force of 125.3N (or ΔT=125.3N) applied to belt 100 by pulley 1. This is the difference in tension in belt 100 due to torque regardless of the installed tension in the belt.

Torque=Force×distance

Torque=1.88 Nm

Distance=Diameter/2=0.030 m/2=0.015m

Force=Torque/distance

Force=1.88 Nm/0.015m

Force=125.3N

Figure 7:
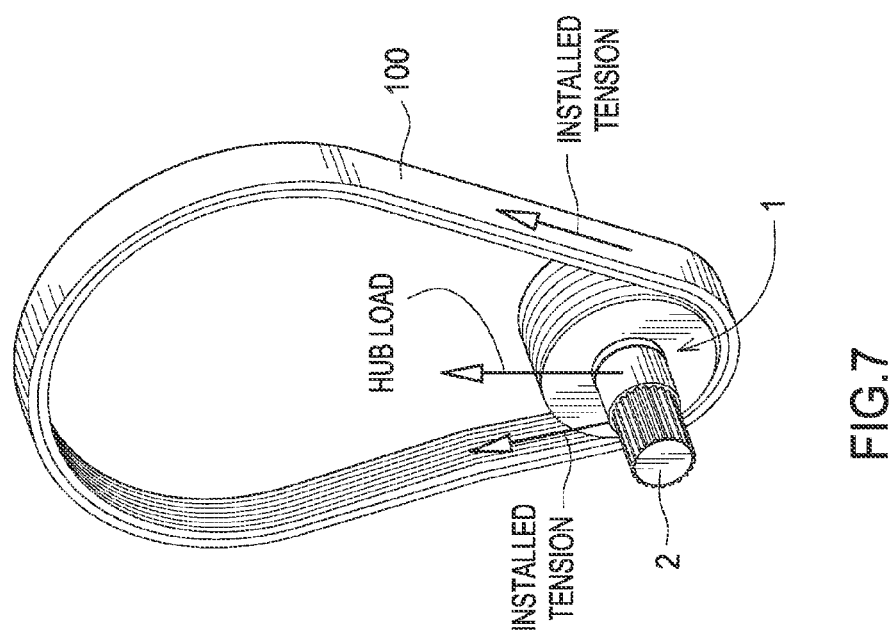
FIG. 7 is a detail of the input pulley and belt.

FIG. 7 is a detail of the input pulley and belt. The difference between the tight side tension and the slack side tension of belt 100 is 125.3N. The slack side tension cannot drop below a certain value without the drive slipping. This value is determined with the calculation of the minimum tension as follows:

$$\frac{T2}{T1} = e^{\mu\theta}$$

Where T2=tight side tension
T1=slack side tension
μ=friction=1
Θ=wrap angle on pulley=139.7 degrees
Solving for T2:

$$T2 = T1 e^{\mu\theta}$$

Additionally the torque is equal to the radius of the pulley times the difference between the tight side tension and the slack side tension:

Torque=$r*\Delta T=r(T2-T1)$

Substituting for T2 and solving for T1:

$$T1 = \frac{\text{Torque}}{R(e^{\mu\theta} - 1)}$$

$$T1 = \frac{1.88}{0.015(e^{1*2.72} - 1)}$$

$$T1 = 12.0 \text{ N}$$

Since ΔT=125N we get T2=137.3N

The value calculated above for T1 is the minimum value so a factor of safety is added to the system, for example, this value is doubled to 24N which gives a tight side tension of 149.3N for belt 100. When there is no torque in the drive, the tight side and slack side tensions equalize to become the installed tension. The magnitude of that is one half the total tension:

$$\text{Installed tension} = T1 = T2 = \frac{1}{2} \text{ total tension} = \frac{1}{2}(149.3 + 24) = 86.6 \text{ N}$$

The hubload is then the resultant of the sum of these tension forces applied at the angle of the belt. To determine the angle of the belt we need to know the wrap angle of the belt around the pulley. Simple geometry yields the following formula for wrap angle:

$WA = \pi - 2\sin(R2-R1/\text{center distance})$

Where:
R2=radius of opposing pulley=36 mm
R1=radius of subject pulley=15 mm
Center distance=the distance between the centers of the pulleys=61 mm
This results in a wrap angle of 139.7 degrees.
The angle of the tension force is:

Tension force angle=$TFA=(180-WA)/2$ $TFA=(180-139.7)/2$

The belt tension forces are at angles of +/−20.15 degrees from the line formed between pulley centers.
The hubload (HL) is then:

Hubload=2(installed tension*cos(TFA))

$$HL=2*(86.6*\cos(20.15))=162.6N$$

The hubload is applied along a line formed through the centers of each pulley pair at the mid width of the belt. The force on the output pulley is equal and opposite the force on the input pulley.

Figure 8:
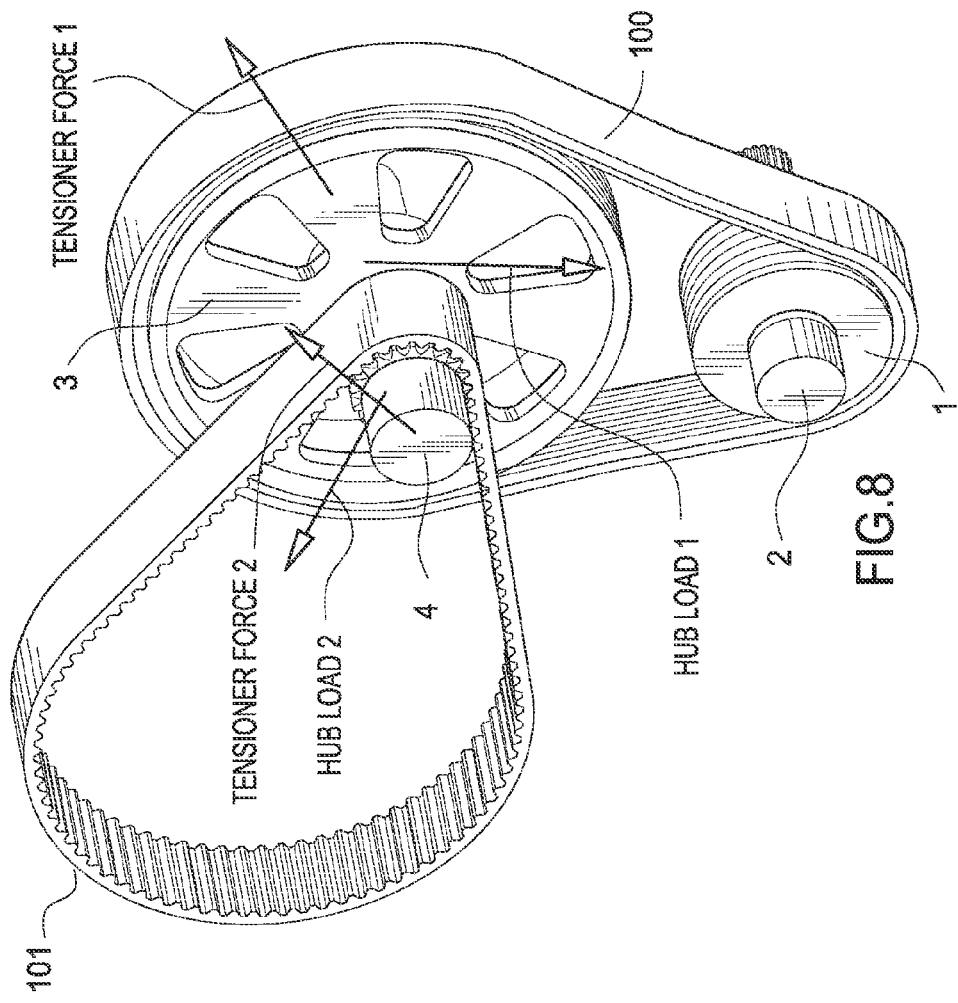
FIG. 8 is a detail of the compound pulley sprocket.

When the pulley is a compound pulley or sprocket, see FIG. 8, the hubload must be determined for both belts and applied in the appropriate direction and location along the shaft. FIG. 8 is a detail of the compound pulley sprocket 3. Since the forces on each shaft cancel, it is possible to calculate the forces necessary from each tensioner to balance the hubloads on the shaft.

Figure 9:
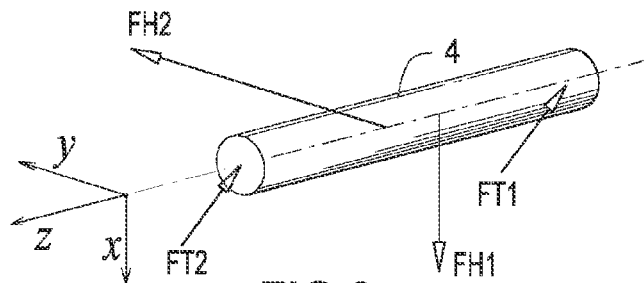
FIG. 9 is a diagram of the forces on the shaft of the first compound pulley/sprocket.
Figure 10:
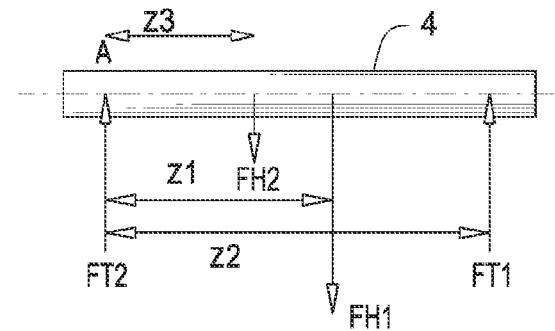
FIG. 10 is a diagram of the position of the forces along the input shaft.
Figure 11:
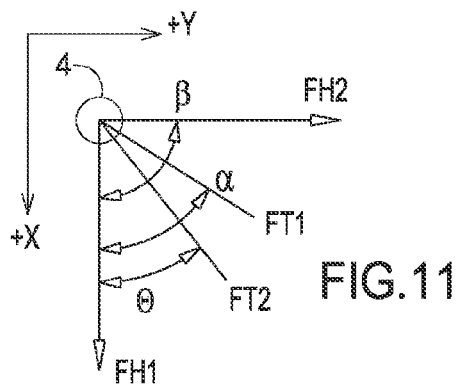
FIG. 11 is a diagram of the angular positions of the forces on the input shaft.

FIG. 9 is a diagram of the forces acting on the shaft 4 of the first compound pulley/sprocket 3. FIG. 10 is a diagram of the position of the forces along the input shaft 4. FIG. 11 is a diagram of the angular positions of the forces on the input shaft 4.

FH1 is the force of hubload from belt 100.
FH2 is the force of hubload from belt 102.
FT1 is the force from tensioner 1.
FT2 is the force from tensioner 2.

In order to determine the forces required in each tensioner, the calculation is simplified by separating the calculations into the forces from each belt and then adding them together. The forces are resolved into an x component and a y component. The x axis is normal to a line formed between the centers of the pulleys of the input drive (z-axis). Considering the x direction from FH1 we get:

Given:
FH1=157.2N
FH2=600N
β=85 deg
FH1 is in the positive X direction
z1=33.5 mm
Z2=48.0 mm
Z3=13.5 mm Summing the forces in the X direction (see FIGS. 7, 8, and 9):

$$0=FH1-FT2x-FT1x$$

Where:
FT2x is the force from tensioner 2 in the x direction.
FT1x is the force from tensioner 1 in the x direction.

Summing the moments about point A (FIG. 10):

$$0=-FH1*z1+FT1x*z2$$

$$FT1x=(z1/z2)*FH1$$

Then:

$$FT1x=109.7N$$

Substituting:

$$FT2x=FH1-FH1x$$

$$FT2x=47.5N$$

Repeating the calculations for the x direction from FH2:

$$FH2\cos\beta=FT2x'+FT1x'$$

$$FT2x'=FH2\cos\beta-FT1x'$$

Summing moments about A:

$$0=-FH2\cos\beta*z3+FT1x'*z2$$

$$FT1x'=FH2\cos\beta*(z3/z2)$$

$$FT1x'=14.7N$$

Substituting:

$$FT2x'=FH2\cos\beta-FT1x'$$

$$FT2x'=37.6N$$

Adding the respective forces in the x direction for the tensioners gives:

$$FT1x''=FT1x+FT1x'$$

$$FT1x''=109.7N+14.7N=124.4N$$

And $$FT2x''=FT2x+FT2x'$$

$$FT2x''=47.5N+37.6N=85.1N$$

Repeating these calculations for forces in the Y direction yields:

$$FT1y''=168.1N$$

$$FT2y''=583.0N$$

Geometry informs the magnetude of FT1 and FT2 by:

$$FT1=\sqrt{FT1x''^2+FT1y''^2}$$

$$FT2=\sqrt{FT2x''^2+FT2y''^2}$$

$$FT1=209.1N$$

$$FT2=589.2N$$

From this, simple geometry gives us the angles of these forces:

$$\Theta=a\sin(FT2y''/FT2)=81.7\text{ deg}$$

$$\alpha=a\sin(FT1y''/FT1)=53.5\text{ deg}$$

Similar determinations of tensioner force can be made for each tensioner position and then each tensioner can be configured to create the required force. Table 1 below is a summary of the required tensioner forces. The values in Table 1 are provided only as examples and are not intended to limit the scope of the invention.

TABLE 1

| | | Input Torque (Nm) | Output Torque (Nm) | Belt inst. Tension (N) | Hub load (N) | angle between stages (deg) | Tens. force 1 (N) | Tens force 1 angle (deg) | Tens. force 2 (N) | Tens. force 2 angle (deg) |
|---|---|---|---|---|---|---|---|---|---|---|
| Interm. Shaft 4 | Stage 1 | 1.88 | 4.51 | 86.64 | 162.68 | 85.00 | 137.19 | 19.40 | 635.18 | 81.88 |
| | Stage 2 | 4.51 | 17.14 | 368.59 | 647.14 | | | | | |
| Interm. | Stage 2 | 4.51 | 17.14 | 368.59 | 647.14 | 88.00 | 967.18 | 80.70 | 1633.23 | 71.68 |

TABLE 1-continued

| | | Input Torque (Nm) | Output Torque (Nm) | Belt inst. Tension (N) | Hub load (N) | angle between stages (deg) | Tens. force 1 (N) | Tens force 1 angle (deg) | Tens. force 2 (N) | Tens. force 2 angle (deg) |
|---|---|---|---|---|---|---|---|---|---|---|
| Shaft 12 | Stage 3 | 17.14 | 62.13 | 942.03 | 1669.02 | | | | | |

Figure 12:
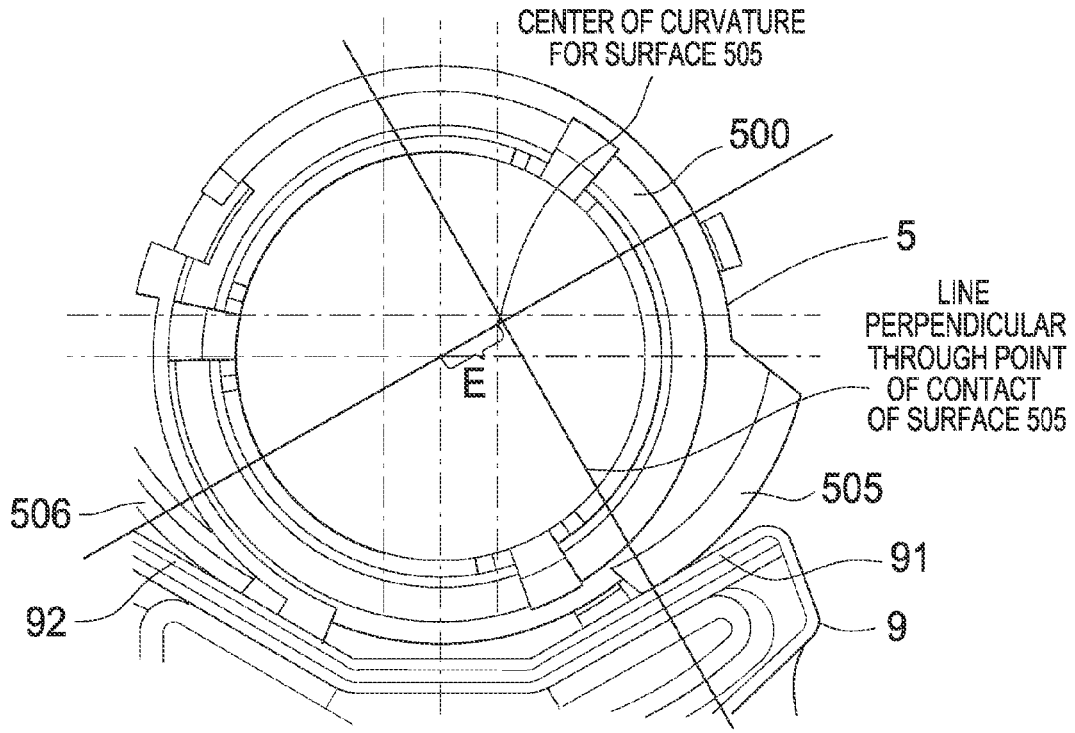
FIG. 12 is a detail of the tensioner.

FIG. 12 is a detail of the tensioner. Again turning to tensioner 5, each arm 500, 510 has a rotation center about the center of shaft 4, also see FIG. 19. Torsion spring 504 simultaneously applies a rotational force to each arm 500, 501. The arms function as an opposing pair with the same torque being applied to each arm. Each arm surface 505, 506 rests against a surface of the housing 9, namely 91, 92 respectively. The torque applied to the arms by the torsion spring 504 causes them to rotate. The resulting rotation causes the tensioner center of rotation, and thereby the center of shaft 4, to move. The center of rotation moves until an opposing force prevents it, namely belt tension. The opposing force which equilibrates the system is the desired belt tension force.

Figure 19:
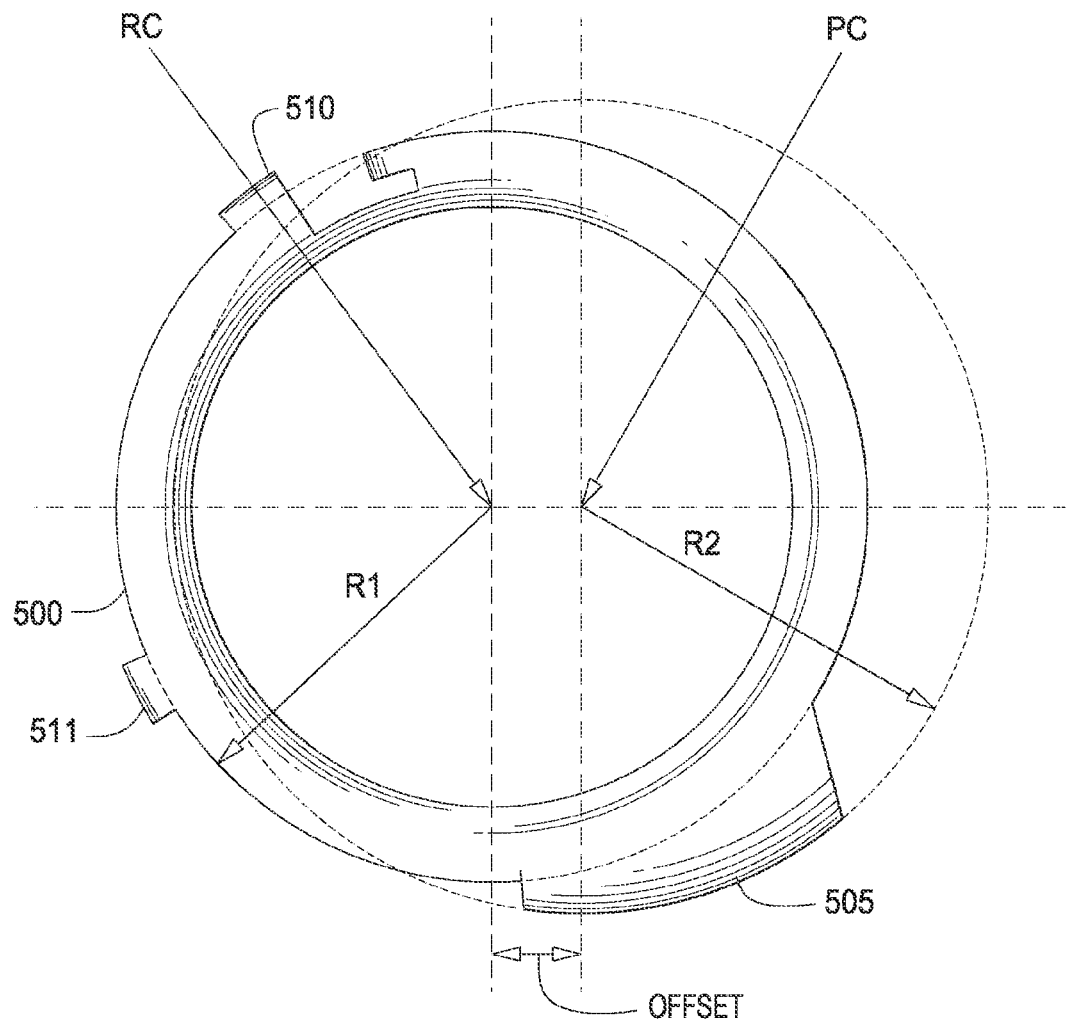
FIG. 19 is a detail of a tensioner arm.

Each arm 500, 501 has a circular profile at the contact surface 505, 506 respectively. The distance between the tensioner rotation center (shaft 4 center) and a line perpendicular to the bracket surface 91 at the point of contact with the arm surface 505, see FIG. 12 and FIG. 19, is the effective tensioner arm length "E". The effective arm length E changes with the rotation of the tensioner arms.

Figure 13:
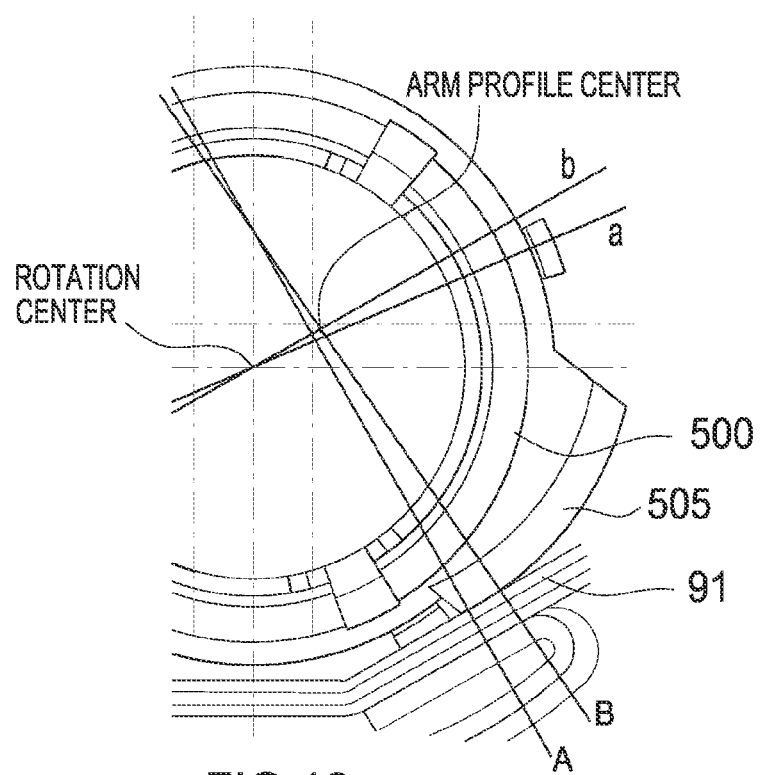
FIG. 13 is a detail of the tensioner.

FIG. 13 is a detail of the tensioner. In FIG. 13 line A is perpendicular to the bracket surface 91 and is perpendicular to line a. Line B is perpendicular to line b. The effective arm length E is the distance from line A to the rotation center along line a.

The center of curvature of the arm surface is offset a fixed distance from its center of rotation. The effective arm length is equal to the offset only when lines A and B are coincident with one another. When lines A and B are not coincident, the effective arm length is less than the center offset (CO) as a function of the angle formed between the lines.

$$E = \text{Effective arm length} = CO^*\cos(\omega)$$

Given:
CO=6 mm
ω=8 deg $$\text{Effective arm length} = 6\cos(8) = 5.94 \text{ mm}$$

The force from each tensioner arm is equal to the torque on the arm divided by the effective arm length.

Knowing the force required of the tensioner acts against the angular surfaces of the housing, for example, 91, 92, at the point of contact of the tensioner arm and the surface, one can determine the force required at these surfaces and from that, the torque required in the tensioner arm.

Given:
SA=Surface 91 angle=30 deg
TF=Tensioner force=635N
Then:

$$\text{Arm force} = (TF/2)^*\cos(SA)$$

$$AF = (635/2)^*\cos(30)$$

$$AF = 275N$$

The torque required in the arm is simply the arm force (AF) times the effective arm length (EAL).

$$\text{Torque} = AF^*EAL$$

$$T = 275N^*0.00594 \text{ m} = 1.63 \text{ Nm}$$

Tensioners 5, 6, 7, 8 are designed such that as the arms rotate, the effective arm length is reduced. Each respective torsion spring (504, 604, 704, 804) also provides less torque as the tensioner arms rotate. If the torsion spring has a spring rate of 0.01 Nm/deg and the arms rotate 20 degrees, then the torque from the spring drops by 0.2 Nm. The effective arm length changes from the above 5.94 mm to 5.30 mm. The resulting tensioner arm force remains nearly constant at 270N.

The included angle of the faces of the housing surfaces 91, 92 can range between 180 deg to 90 deg giving a surface angle of 0 deg to 45 deg as described above, see FIG. 14, FIG. 15 and FIG. 19.

If the angle between surfaces 91, 92 is 0 degrees, there is no horizontal force component from the tensioner arms. Surface angles greater than zero causes the tensioner to self center due to the horizontal component of the force being equal and opposite from each tensioner arm. If the surface angle exceeds 45 degrees, these horizontal components exceed the tensioning force. This creates a condition of "diminishing returns" on the spring torque. As the spring torque is increased, the horizontal component of tensioner force grows more than the tensioning force.

Figure 14:
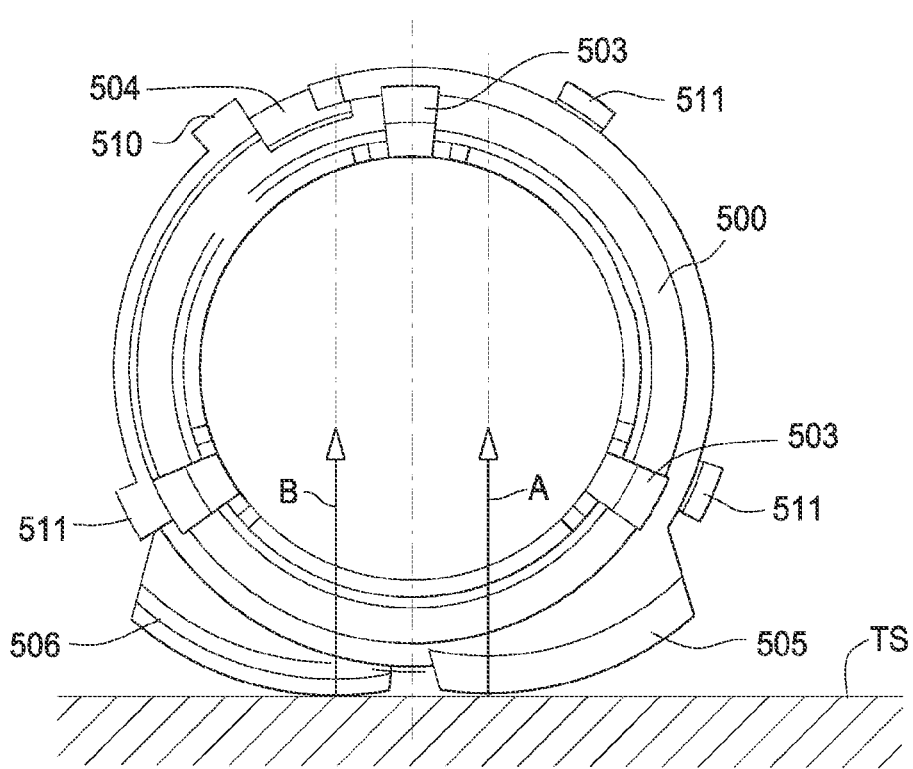
FIG. 14 is a detail of the force components in the tensioner arms.

FIG. 14 is a detail of the force components in the tensioner arms. Vector "A" indicates the force on surface 505 exerted by surface "TS" at the point of contact between 505 and TS. Vector "B" indicates the force on surface 506 exerted by surface "TS" at the point of contact between 506 and TS. Surface TS is analogous to surface 91 and surface 92. Surface TS depicts the 180 degree condition between surfaces 91, 92. Given the offset of each tensioner arm 500, 501, see FIG. 5 and FIG. 19, vectors A and B are not co-axial.

FIG. 15 is a perspective view of housing 9. Housing 9 comprises bracket surface 91 and bracket surface 92. Tensioner surface 505 and tensioner surface 506 engage surfaces 91 and 92 respectively.

Figure 16:
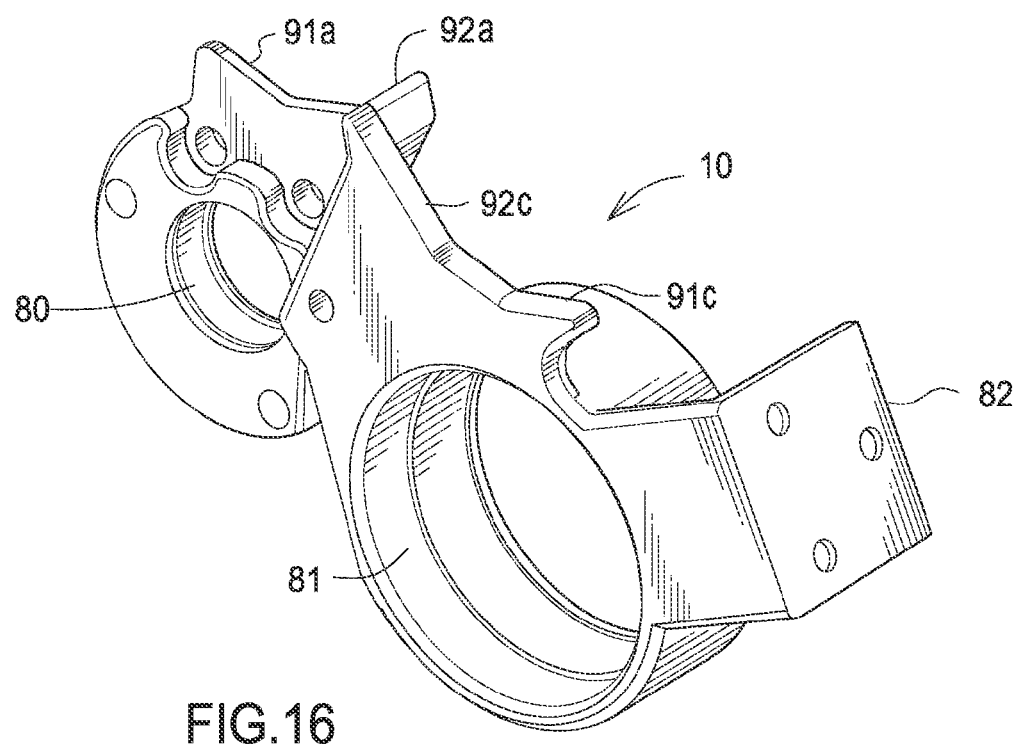
FIG. 16 is a perspective view of housing 10.

FIG. 16 is a perspective view of housing 10. Bearing 50 engages receiving portion 80. Bearing 56 engages receiving portion 81. Tensioner surface 805 engages surface 91c. Tensioner surface 806 engages surface 92c. Tensioner surface 605 engages surface 91a. Tensioner surface 606 engages surface 92a.

Figure 17:
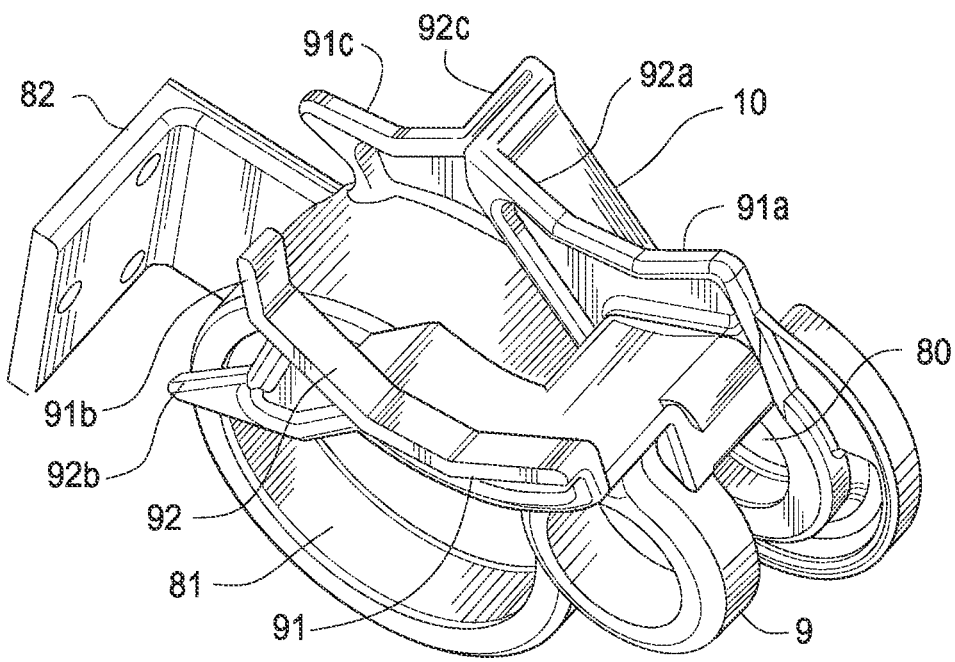
FIG. 17 is a perspective view of the assembled housing parts.

FIG. 17 is a perspective view of the assembled housing parts. Bracket 82 on housing 10 provides means to attach the device to a mounting surface (not shown). Tensioner 5 engages surfaces 91 and 92. For tensioner 6, arcuate surfaces 605 and 606 engage surfaces 91a and 92a respectively. For tensioner 7, arcuate surfaces 705 and 706 engage surfaces 91b and 92b respectively. For tensioner 8, arcuate surfaces 805 and 806 engage surfaces 91c and 92c respectively.

Figure 18:
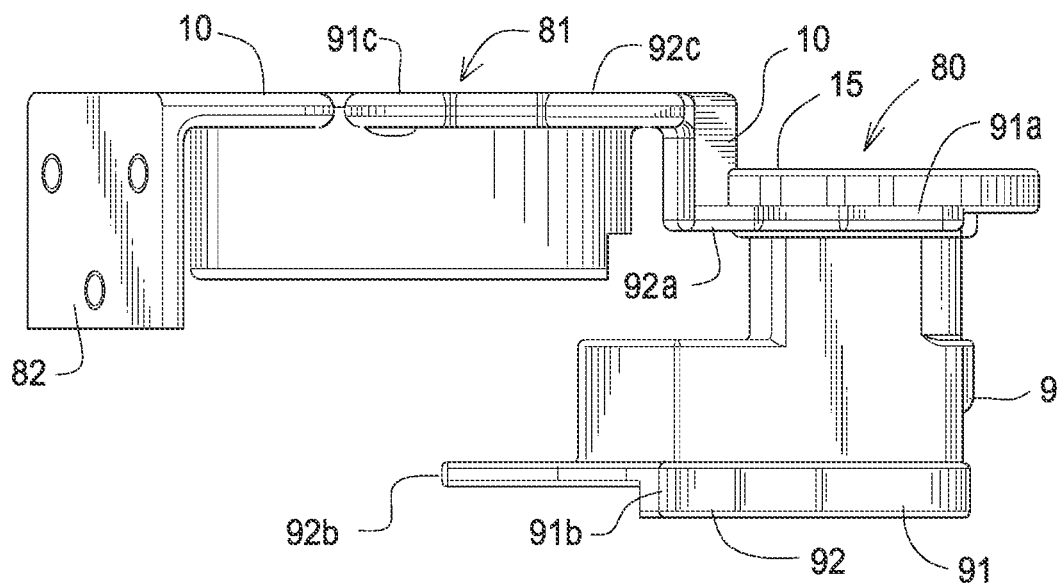
FIG. 18 is a plan view of the assembled housing parts.

FIG. 18 is a plan view of the assembled housing parts.

FIG. 19 is a detail of a tensioner arm. Rotation center (RC) is the point about which the arm 500 rotates during operation. RC also coincides with the axis of rotation of shaft 4. The arm profile center (PC) is the center of curvature of surface 505, see FIG. 13. The distance between the two points is the offset. The rotation center radius (R1) is less than the radius of curvature (R2) of surface 505. This description is also applicable to arm 501. This description for FIG. 19 also applies to each of the arms for tensioners 6, 7 and 8.

Although a form of the invention has been described herein, it will be obvious to those skilled in the art that variations may be made in the construction and relation of parts and method without departing from the spirit and scope of the invention described herein.

We claim:

1. A belt transmission comprising:
a first belt trained between a first shaft and a first intermediate shaft;
a second belt trained between the first intermediate shaft and a second intermediate shaft;
a third belt trained between the second intermediate shaft and a second shaft;
a first tensioner and second tensioner engaged about the first intermediate shaft, the first tensioner and second tensioner each comprising a first arm and second arm and a first spring engaged therebetween, the first arm and second arm each bearing upon a housing surface, the first arm and second arm rotatable by operation of the first spring to thereby exert a force upon the first intermediate shaft to impart a tension to the first belt and second belt; and
a third tensioner and fourth tensioner engaged about the second intermediate shaft, the third tensioner and fourth tensioner each comprising a first arm and second arm and a second spring engaged therebetween, the first arm and second arm each bearing upon a housing surface, the first arm and second arm rotatable by operation of the second spring to thereby exert a force upon the second intermediate shaft to impart a tension to the second belt and third belt.

2. The belt transmission as in claim 1, wherein the first belt comprises a multi-ribbed profile, the second belt comprises a toothed profile and the third belt comprises a toothed profile.

3. The belt transmission as in claim 1, wherein the first spring is a torsion spring.

4. The belt transmission as in claim 1, wherein the second spring is a torsion spring.

5. The belt transmission as in claim 1, wherein the first shaft is an input shaft.

6. The belt transmission as in claim 1, wherein the second shaft is an output shaft.

7. A belt transmission comprising:
a housing comprising a mount for receiving a driver;
a first belt trained between a first shaft and a first intermediate shaft;
the first shaft connectable to the driver;
a second belt trained between the first intermediate shaft and a second intermediate shaft;
a third belt trained between the second intermediate shaft and a second shaft, the second shaft connectable to a load;
a first tensioner engaged about the first intermediate shaft, the first tensioner comprising a first arm and second arm and a first spring engaged therebetween, the first arm and second arm each bearing upon a first housing surface, the first arm and second arm rotatable by operation of the first spring to exert a force upon the first intermediate shaft whereby a tension is imparted to the first belt and second belt; and
a second tensioner engaged about the second intermediate shaft, the second tensioner comprising a first arm and second arm and a second spring engaged therebetween, the first arm and second arm each bearing upon a second housing surface, the first arm and second arm rotatable by operation of the second spring to exert a force upon the second intermediate shaft, which is moveable during operation of the belt transmission, whereby a tension is imparted to the second belt and third belt.

8. The belt transmission as in claim 7, wherein the first belt comprises a multi-ribbed profile, the second belt comprises a toothed profile and the third belt comprises a toothed profile.

9. The belt transmission as in claim 7, wherein the first spring is a torsion spring.

10. The belt transmission as in claim 7, wherein the second spring is a torsion spring.

11. A belt transmission comprising:
a housing comprising a mount for receiving a driver;
a first belt trained between a first shaft and a first intermediate shaft;
the first shaft connectable to the driver;
a second belt trained between the first intermediate shaft and a second intermediate shaft;
a third belt trained between the second intermediate shaft and a second shaft, the second shaft connectable to a load;
a first tensioner and a second tensioner engaged about the first intermediate shaft, the first tensioner and second tensioner each comprising a first arm and second arm and a torsion spring engaged therebetween, the first arm and second arm each bearing upon a housing surface, the first arm and second arm rotatable about the first intermediate shaft by operation of the torsion spring to exert a force upon the first intermediate shaft whereby a tension is imparted to each of the first belt and second belt; and
a third tensioner and a fourth tensioner engaged about the second intermediate shaft, the third tensioner and fourth tensioner each comprising a first arm and second arm and a torsion spring engaged therebetween, the first arm and second arm each bearing upon a second housing surface, the first arm and second arm rotatable about the second intermediate shaft by operation of the torsion spring to exert a force upon the second intermediate shaft whereby a tension is imparted to each of the second belt and third belt.

12. The belt transmission as in claim 11, wherein the first belt comprises a multi-ribbed profile, the second belt comprises a toothed profile and the third belt comprises a toothed profile.

13. A belt transmission comprising:
a housing;
a first belt trained between a first shaft and a first intermediate shaft;
a second belt trained between the first intermediate shaft and a second intermediate shaft;
a third belt trained between the second intermediate shaft and a second shaft;
a first tensioner and second tensioner each engaged with the housing and each engaged about the first intermediate shaft whereby each tensioner exerts a force upon the first intermediate shaft which thereby imparts a tension to the first belt and to the second belt; and
a third tensioner and fourth tensioner each engaged with the housing and each engaged about the second intermediate shaft whereby each tensioner exerts a force upon the second intermediate shaft which thereby imparts a tension to the second belt and to the third belt.

14. The belt transmission as in claim 13, wherein the first tensioner and second tensioner each comprise a first arm and second arm and a first spring engaged therebetween, the first arm and second arm each bearing upon a housing surface, the first arm and second arm moveable by operation of the first spring.

15. The belt transmission as in claim 14, wherein the first spring comprises a torsion spring.

16. The belt transmission as in claim 13, wherein the third tensioner and fourth tensioner each comprising a first arm and second arm and a second spring engaged therebetween, the first arm and second arm each bearing upon a housing surface, the first arm and second arm moveable by operation of the second spring.

17. The belt transmission as in claim 16, wherein the second spring comprises a torsion spring.

18. The belt transmission as in claim 13, wherein the first belt comprises a multi-ribbed profile, the second belt comprises a toothed profile and the third belt comprises a toothed profile.

19. A belt transmission comprising:
a housing;
a first belt trained between a first shaft and a first intermediate shaft;
a second belt trained between the first intermediate shaft and a second intermediate shaft;
a third belt trained between the second intermediate shaft and a second shaft;
a first tensioner and second tensioner each engaged with the housing and each engaged about the first intermediate shaft whereby each tensioner exerts a force upon the first intermediate shaft which thereby imparts a tension to the first belt and to the second belt; and
a third tensioner and fourth tensioner each engaged with the housing and each engaged about the second intermediate shaft whereby each tensioner exerts a force upon the second intermediate shaft which thereby imparts a tension to the second belt and to the third belt.

20. The belt transmission as in claim 19, wherein the first tensioner comprises a first tensioner first arm and a first tensioner second arm and a first tensioner spring engaged therebetween, an arcuate first tensioner first arm surface and an arcuate first tensioner second arm surface each bearing upon a housing surface, the first tensioner first arm and first tensioner second arm moveable by operation of the first tensioner spring.

21. The belt transmission as in claim 19, wherein the second tensioner comprises a second tensioner first arm and a second tensioner second arm and a second tensioner spring engaged therebetween, an arcuate second tensioner first arm surface and an arcuate second tensioner second arm surface each bearing upon a housing surface, the second tensioner first arm and second tensioner second arm moveable by operation of the second tensioner spring.

22. The belt transmission as in claim 19, wherein the third tensioner comprises a third tensioner first arm and a third tensioner second arm and a third tensioner spring engaged therebetween, an arcuate third tensioner first arm surface and an arcuate third tensioner second arm surface each bearing upon a housing surface, the third tensioner first arm and third tensioner second arm moveable by operation of the third tensioner spring.

23. The belt transmission as in claim 19, wherein the fourth tensioner comprises a fourth tensioner first arm and a fourth tensioner second arm and a fourth tensioner spring engaged therebetween, an arcuate fourth tensioner first arm surface and an arcuate fourth tensioner second arm surface each bearing upon a housing surface, the fourth tensioner first arm and fourth tensioner second arm moveable by operation of the fourth tensioner spring.

24. The belt transmission as in claim 19, wherein the first belt comprises a multi-ribbed profile, the second belt comprises a toothed profile and the third belt comprises a toothed profile.

25. A belt transmission comprising:
a housing;
a first multi-ribbed belt trained between an input shaft and a first intermediate shaft;
a second belt having teeth trained between the first intermediate shaft and a second intermediate shaft;
a third belt having teeth trained between the second intermediate shaft and an output shaft;
a first tensioner and second tensioner each engaged with the housing and each engaged about the first intermediate shaft whereby each tensioner exerts a force upon the first intermediate shaft which thereby imparts a tension to the first belt and to the second belt; and
a third tensioner and fourth tensioner each engaged with the housing and each engaged about the second intermediate shaft whereby each tensioner exerts a force upon the second intermediate shaft which thereby imparts a tension to the second belt and to the third belt.

26. A belt transmission comprising:
an input shaft;
a first belt trained between the input shaft and a first intermediate shaft;
a second belt trained between the first intermediate shaft and a second intermediate shaft;
a third belt trained between the second intermediate shaft and an output shaft;
the position of the first intermediate shaft being moveable during operation of the belt transmission to thereby apply a tension to the first belt and second belt; and
the position of the second intermediate shaft being moveable during operation of the belt transmission to thereby apply a tension to the second belt and the third belt.

27. The belt transmission as in claim 26, wherein the first intermediate shaft is supported by a first tensioner and a second tensioner.

28. The belt transmission as in claim 27, wherein:
the first tensioner comprises a first arcuate surface bearing upon the housing and a second arcuate surface bearing upon the housing.

29. The belt transmission as in claim 26, wherein the second intermediate shaft is supported by a third tensioner and a fourth tensioner.

30. The belt transmission as in claim 26, wherein the first belt has a multi-ribbed profile.

* * * * *